United States Patent [19]

Mizukawa et al.

[11] 4,447,691
[45] May 8, 1984

[54] CIRCUIT FOR DETECTING A UTENSIL LOAD PLACED ASYMMETRICALLY RELATIVE TO AN INDUCTION HEATING COIL

[75] Inventors: Takumi Mizukawa, Neyagawa; Keizo Amagami, Takatsuki; Takao Kobayashi, Hirakata, all of Japan

[73] Assignee: Matsushita Electric Industrial Company, Limited, Osaka, Japan

[21] Appl. No.: 173,802

[22] Filed: Jul. 30, 1980

[30] Foreign Application Priority Data

Jul. 31, 1979 [JP] Japan ................................ 54-98218
Jul. 31, 1979 [JP] Japan ................................ 54-98219

[51] Int. Cl.³ .............................................. H05B 6/12
[52] U.S. Cl. .......................... 219/10.49 R; 219/10.77; 219/10.67; 219/518; 340/686; 324/260; 99/DIG. 14
[58] Field of Search .............. 219/10.49 R, 10.77, 219/10.75, 10.67, 10.79, 10.43, 518, 450; 340/686, 687; 99/451, DIG. 14, ; 324/260, 261, 219, 220

[56] References Cited

U.S. PATENT DOCUMENTS

| 3,100,281 | 8/1963 | Spanner | 340/686 X |
|---|---|---|---|
| 3,223,414 | 12/1965 | Uecker | 340/686 X |
| 3,268,805 | 8/1966 | Normando | 324/260 X |
| 3,463,491 | 8/1969 | Shaw | 340/686 X |
| 3,492,670 | 1/1970 | Ault et al. | 324/260 X |
| 3,582,769 | 6/1971 | Brandenburg | 324/260 X |
| 3,796,850 | 3/1974 | Moreland et al. | 219/10.49 R |
| 4,013,859 | 3/1977 | Peters, Jr. | 219/10.49 R |
| 4,016,392 | 4/1977 | Kobayashi et al. | 219/10.77 |
| 4,319,109 | 3/1982 | Bowles | 219/10.77 X |

FOREIGN PATENT DOCUMENTS

| 2542898 | 3/1977 | Fed. Rep. of Germany . |
|---|---|---|
| 53-13240 | 2/1978 | Japan . |
| 1304393 | 1/1973 | United Kingdom . |
| 1343556 | 1/1974 | United Kingdom . |
| 1363612 | 8/1974 | United Kingdom . |

Primary Examiner—B. A. Reynolds
Assistant Examiner—Philip H. Leung
Attorney, Agent, or Firm—Lowe, King, Price & Becker

[57] ABSTRACT

A plurality of magnetic field sensors are mounted adjacent the periphery of an induction heating coil of flat, spiral configuration which is energized by ultrasonic frequency energy to generate a time-varying magnetic field. The magnetic field sensors are connected in a ciruit to produce an output signal when a magnetic utensil load is placed asymmetrically with respect to the center of the induction heating coil. In response to sensor output exceeding a predetermined value a warning indication is provided. The ultrasonic energy level is reduced in response to the warning indication to minimize radio interference which would otherwise occur due to leakage magnetic flux.

49 Claims, 11 Drawing Figures

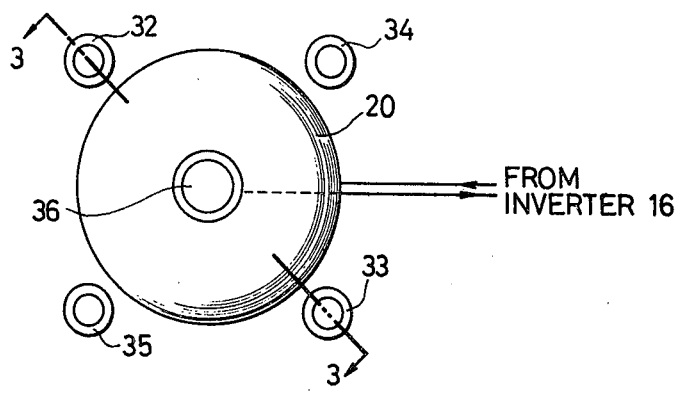
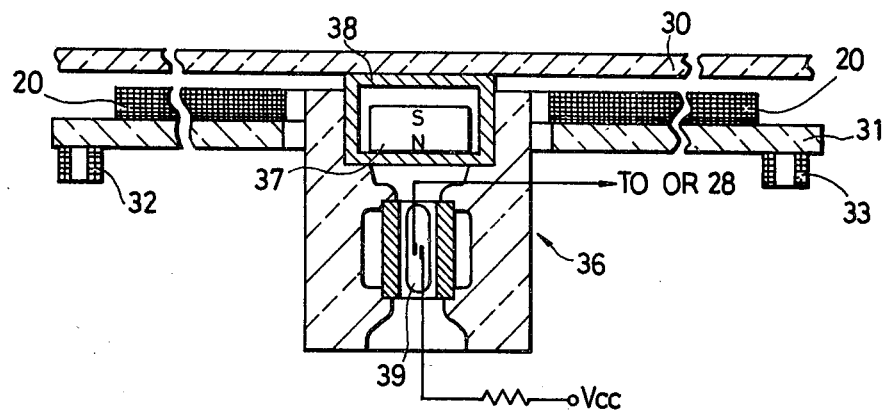
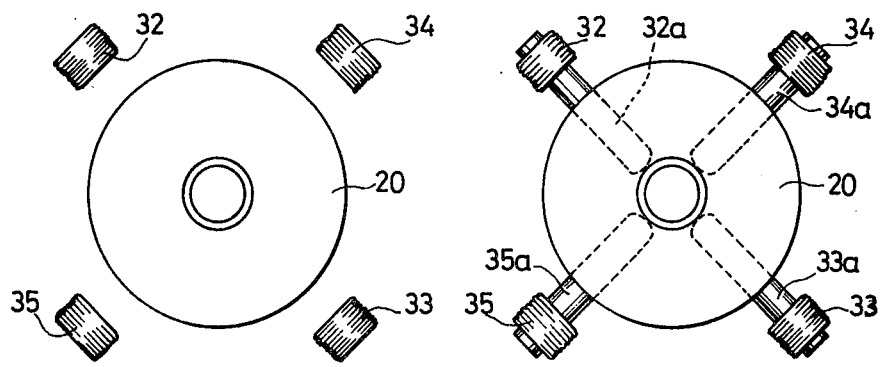

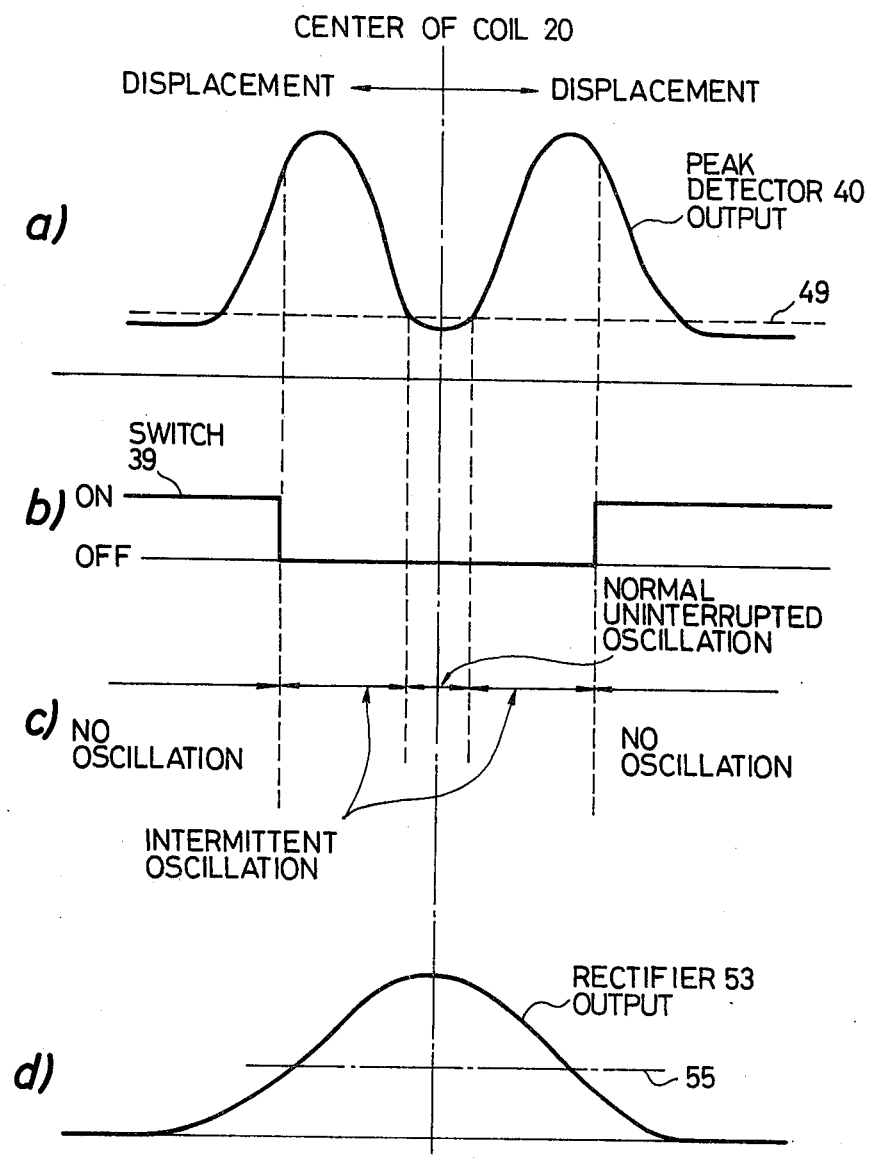

CIRCUIT FOR DETECTING A UTENSIL LOAD PLACED ASYMMETRICALLY RELATIVE TO AN INDUCTION HEATING COIL

BACKGROUND OF THE INVENTION

The present invention relates generally to induction heating cooking apparatus, and in particular to a detecting circuit for detecting improper placement of a utensil load with respect to an induction heating coil with which the load is electromagnetically coupled to generate heat.

Induction heating cooking apparatus usually comprises an inverter and an induction heating coil of a flat, spiral configuration mounted below a cook top. The coil is energized by ultrasonic frequency energy provided by the inverter to generate a time-varying magnetic field. When a utensil of proper size and material is symmetrically placed with respect to the center of the heating coil, i.e. the center of utensil bottom coinciding the center of heating coil, electromagnetic coupling between the heating coil and the utensil is at a maximum so that a maximum amount of heat is generated in the utensil. Although the cook top surface is usually marked with radial lines indicating the proper location of utensil for maximum power delivery thereto, the utensil is often displaced from the marked area resulting in a loss of power and a leakage of magnetic flux which causes radio interference.

SUMMARY OF THE INVENTION

Accordingly, an object of the present invention is to detect improper placement of a utensil load with respect to the induction heating coil to give a warning indication to urge the user to correct the location of the utensil.

The detecting circuit of the invention comprises a plurality of magnetic field sensors or detecting coils arranged in pairs adjacent the periphery of the induction heating coil. The magnetic field sensors of each pair are located diametrically opposite to each other and electrically connected in opposite sense so that the output of each is cancelled by the output of the other. If a utensil is asymmetrically located with respect to the heating coil, the magnetic field intensities on the perimeter of the coil are unbalanced causing an output signal to be derived from the terminals of the magnetic field sensors. This output signal is compared in a comparator with a reference value representing a boundary for the proper location of the utensil. If the output signal is greater than the reference value, a warning indication is given in the form of a visual or an audible signal. Simultaneously the output level of the inverter is reduced in response to the warning indication, so that the effect of radio interference resulting from the leaked magnetic flux is minimized.

Preferably, a monostable multivibrator is provided to generate an inhibit pulse in response to the output of the comparator for inhibiting the output of the inverter for a brief interval. At the termination of this interval, the ultrasonic frequency energy is again generated and the comparator again generates an output signal due to a feedback action to inhibit the inverter output again. This process is repeated as long as the utensil remains displaced from the center of the heating coil to provide intermittent operation of the inverter during the time when the warning indication is given. The intermittent generation of ultrasonic energy serves as a search signal for automatically resuming the normal, uninterrupted generation of ultrasonic power when the user corrects the location of the utensil.

The detector circuit also comprises a proximity sensor located at the center of the induction heating coil to detect the absence of a utensil on the cook top for inhibiting the inverter operation when the utensil is displaced to the extent that its bottom surface does not overlay the center of the heating coil. This provides power savings when no utensil is placed on the cook top after activation of a power switch or during the time when utensils are interchanged.

Vertical displacement of the utensil can also be detected by the inclusion of an input power detector circuit which detects the power input to the inverter and compares it with a reference level. When the reference level is exceeded, the inverter is inhibited at periodic intervals to reduce the output power thereof, thereby minimizing radio interference.

BRIEF DESCRIPTION OF THE DRAWINGS

The invention is further described in detail by way of example with reference to the accompanying drawings, in which:

FIG. 2 is an illustration of an arrangement of magnetic field sensors with respect to the induction heating coil;

FIG. 3 is an illustration of a cross-sectional view taken along the lines 3—3 of FIG. 2;

FIGS. 5a-5d are illustrations of waveforms appearing in the diagram of FIG. 1;

FIGS. 6 and 7 are illustrations of alternative arrangements of the magnetic field sensors.

DETAILED DESCRIPTION

Figure 1:
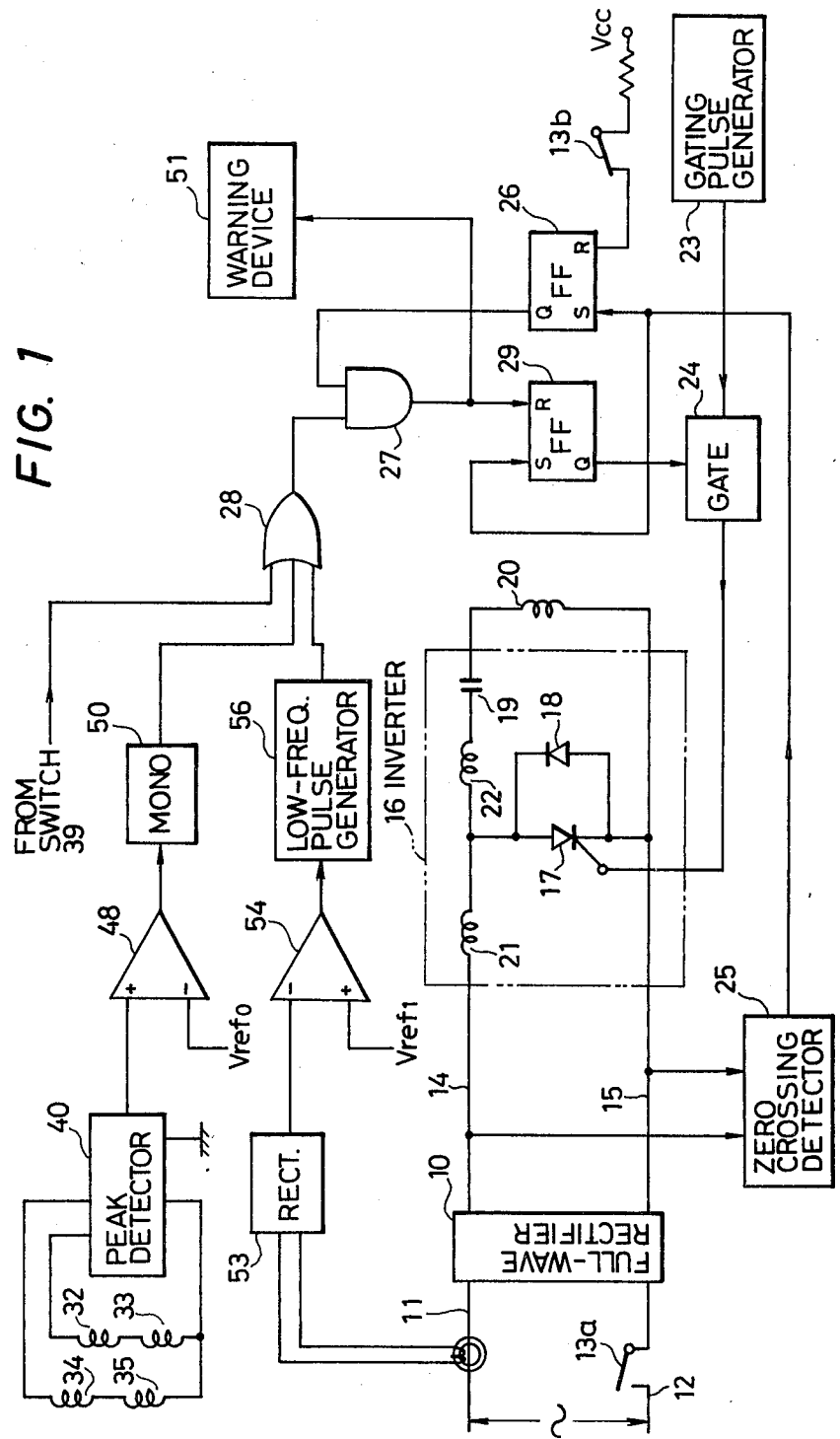
FIG. 1 is a block diagram of an induction heating cooking apparatus incorporating the detector circuit of the invention.

Referring now to FIG. 1, an induction heating cooking apparatus of the present invention is schematically illustrated. The cooking apparatus comprises a fullwave rectifier 10 connected in an A.C. power circuit including lines 11, 12, a power switch 13a and an A.C. power source, not shown. Fullwave rectified, unfiltered sinusoidal halfwave pulses are supplied by rectifier 10 through positive and negative lines 14, 15 to an inverter 16 of conventional design which includes a power-rated gate-controlled switching device such as thyristor 17, having anode and cathode terminals respectively connected to the positive and negative lines 14 and 15. A commutating diode 18 is connected in a parallel inverse relation with the thyristor 17 to allow commutating current flow, to pass therethrough in response to the discharging action of a commutating capacitor 19 which forms, with an induction heating coil 20, a commutating circuit tuned to an ultrasonic frequency. This commutating circuit is connected in series with filter inductors 21, 22 to the output of the rectifier 10 to receive the full-wave rectified, unfiltered voltage. By the well known inverter action the commutating circuit generates a high frequency current in the ultrasonic frequency range in response to gating pulses supplied via gate circuit 24 to the control gate of the thyristor 17 from a gating pulse generator 23.

To prevent surging currents which would occur if the thyristor 17 is fired at a relatively high anode potential, a zero crossing detector 25 is connected to the lines 14 and 15 to detect zero voltage point of the full-wave rectified voltage in order for the gating pulses to be applied when the thyristor anode potential is relatively low. The output of the zero crossing detector 25 is connected to the set input of a flip-flop 26, having a Q output connected to an input of an AND gate 27. This AND gate receives an inhibit signal from an OR gate 28, the function of which is described later. AND gate 27 provides a logic one signal to the reset input of a flip-flop 29 which receives a set signal from the zero crossing detector 25 to cause the gate circuit 24 to open for application of gating pulses from the generator 23 to the thyristor 17.

The induction heating coil 20 is of a spiral wound, flat configuration as illustrated in FIG. 2 and mounted on a support 31 below a ceramic cook top or top-plate 30, FIG. 3. Adjacent the perimeter of the heating coil 20 and below the support 31 are mounted a first pair of diametrically opposed coils 32 and 33 and a second pair of diametrically opposed coils 34 and 35. In a center of the heating coil 20 is located a magnetic proximity sensing device 36 which includes a permanent magnet 37, vertically movably located within a suitable housing 38 directly below the cook top 30. Below the permanent magnet 37 is mounted a reed switch 39 which responds to the magnetic field produced by the permanent magnet 37. When permanent magnet 37 is in the lower illustrated position, the contacts of reed switch 39 are closed to generate an output indicating the absence of a utensil on the cook top 30. The output of the reed switch 39 is connected to an input of the OR gate 28.

Figure 4:
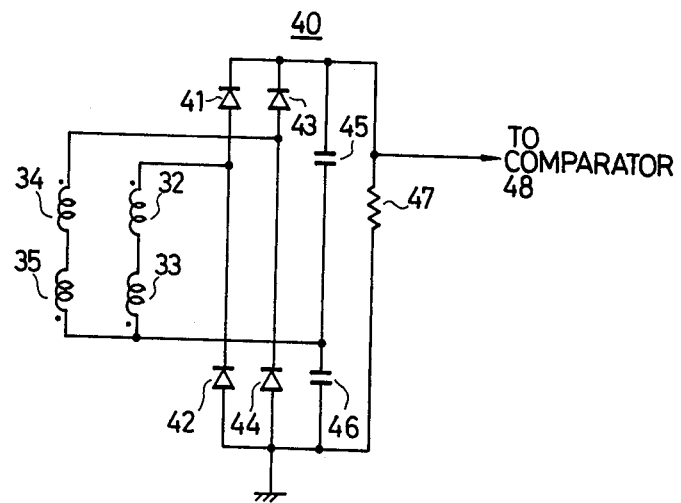
FIG. 4 is an illustration of an electrical connection of the magnetic field sensors or coils in a peak detector.

FIG. 4 is an illustration of the connection of the coils 32-35. As shown the windings of the coils in each pair are connected in opposite sense in a series circuit to a peak detector 40. More specifically, the peak detector 40 comprises a first pair of series connected diodes 41, 42 and a second pair of diodes 43, 44, the diode pairs being connected in parallel with series-connected capacitors 45, 46 which are in turn connected in parallel with a load resistor 47. One end of the resistor 47 is connected to ground, the other end being connected to a noninverting input of a comparator 48 (FIG. 1). The first pair of detecting coils 32 and 33 is connected between the junction of diodes 41, 42 and the junction of capacitors 45, 46 and the second pair of coils 34, 35 is connected between the junction of diodes 43, 44 and the junction of capacitors 45, 46. All of these diodes rectify the voltage developed in the coils 32-35; the rectified voltage is stored in the capacitors 45 and 46 and smoothed by the filtering action provided by the capacitors 45, 46 and the resistor 47. Therefore, the voltage developed across the load resistor 47 is indicative of the peak value of the combined output of the detector coils 32-35.

A time-varying magnetic field is generated by the induction heating coil 20 in response to the switching action of the thyristor 17 and the commutating action of the commutating capacitor 19 and heating coil 20. This magnetic field generates eddy currents in the bottom of a utensil located on the cook top 30 in overlaying relation with the heating coil 20. The eddy currents are converted into heat in proportion to the product of the eddy current value and the electrical resistance value of the material that constitutes the utensil. The amount of heat so generated in the utensil is at a maximum when the utensil is located so that the center of the utensil bottom surface coincides the center of heating coil 20.

Because of the symmetrical arrangement of the detecting coils 32-35, the intensities of the magnetic field adjacent the perimeter of the heating coil 20 are balanced when the utensil is correctly located on the cook top 30, so that the voltages developed in the detector coils 32-35 are of equal magnitude and completely cancelled out, thereby generating substantially no voltage input to the peak detector 40.

As illustrated in FIG. 5a, the output of the peak detector 40 varies symmetrically as a function of the displacement of the utensil center from the center of coil 20. The detector 40 output voltage is at a minimum when the utensil is located at the coil center, increases toward maximum level as the displacement increases, and again decreases toward the minimum level as the displacement further increases to the point where no electromagnetic coupling exists between the coil 20 and the utensil.

The comparator 48 provides comparison between the output of the peak detector 40 and a reference voltage $V_{ref0}$ indicated by lever 49 in FIG. 5a which represents the boundary of an area in which the electromagnetic coupling is at a maximum. The output of comparator 48 is driven into a high voltage level when the peak detector 40 output is higher than the reference voltage $V_{ref0}$. The high-level output of comparator 48 is connected to a monostable multivibrator 50 so that the latter provides a rectangular pulse of a predetermined duration, in turn supplied to an input of the OR gate 28.

The operation of the induction heating cooking apparatus of the invention is as follows. Manual operation of a power switch 13a supplies the full-wave rectifier 10 with an A.C. current to energize the lines 14 and 15 for the inverter 16, as well as other circuit components, with a D.C. voltage to put them into a state of readiness to permit generation of ultrasonic frequency current in the heating coil 20. The zero crossing detector 25 provides an output signal in response to a first zero crossing point of the full-wave rectified, unfiltered voltage appearing on the lines 14, 15 after the operation of the switch 13a; the output signal of detector 25 triggers flip-flops 26 and 29 into a set condition. The AND gate 27 remains disabled during the start-up period until the apparatus is put into the state of readiness for operation by the D.C. voltage supplied from the rectifier 10 through a power feed circuit, not shown. In this embodiment, an indication that the apparatus is ready for operation is given by the output of the zero crossing detector 25. Other methods could equally as well be employed to provide this indication.

When a utensil of a magnetic material is correctly placed on the cook top 30, no inhibit signal is present to the AND gate 27, so that flip-flop 29 is switched to the set condition to enable the gate 24 to pass gating pulses from the pulse generator 23 to the control gate of the thyristor 17, whereby ultrasonic frequency current is generated in the induction heating coil 20.

If the utensil is not correctly placed on the cook top, the reference level $V_{ref0}$ is exceeded, whereby the comparator 48 supplies a signal to monostable multivibrator 50 which is in turn generates an inhibit pulse signal that is applied through OR gate 28 to the AND gate 27. With gate 27 enabled by the flip-flop 26 in response to the output of the zero crossing detector 25, the flip-flop 29 is switched to a reset condition which disables the gate 24, preventing the passage of gating pulses to the thyristor 17. Therefore, the output of the inverter 16 is inhibited for the interval of the monostable multivibrator 50. After this inhibit interval terminates, the gate 24 is again enabled in response to an output from the zero crossing detector 25 when the latter senses a zero crossing point immediately following the termination of the inhibit interval. The above process is repeated to provide interrupted inverter oscillation as long as the utensil is improperly located on the cook top 30 with respect to the underlying induction heating coil 20 (see FIG. 5c). Therefore, the output of the AND gate 27 appears as a train of pulses and this pulse train is applied to a warning indication device 51 to provide a visual or audible indication to the user. The intermittent oscillation or the ultrasonic energy serves as a signal for detecting when the utensil is relocated to the center of the heating coil 20 to automatically resume the normal, uninterrupted inverter operation.

If the location of the utensil is such that a bottom surface thereof does not overlay the center of the heating coil 20, the proximity detector switch 39 detects this condition and provides an inhibit signal, FIG. 5b, to the OR gate 28 and thence to the AND gate 27. When this occurs, the high frequency oscillation is continuously inhibited (see FIG. 5c) and the warning device 51 gives a continuous indication that the utensil is excessively displaced from the center of the heating coil 20. This advantageously avoids the waste of power when utensils are replaced for heating different foodstuffs.

In a further embodiment of the invention, a current transformer 52 is provided in the power circuit line 11 to sense the amount of input power to the apparatus. The winding of this current transformer is connected to a rectifier 53 to provide a D.C. voltage representative of the sensed input power level to the inverting input terminal of a comparator 54. As illustrated in FIG. 5d, the output of the rectifier 53 has a single maximum value when the utensil is located correctly at the center of the heating coil 20 and gradually decays as the utensil is displaced outward from the center of the heating coil. The output of the rectifier 53 is compared in the comparator 54 with a reference voltage $V_{refl}$ indicated by numeral 55 in FIG. 5d so that the comparator 54 generates a high voltage output when the rectifier 53 output is lower than the reference voltage $V_{refl}$. The high level output of the comparator 54 is applied to an enabling input of a low frequency pulse generator 56 which generates a train of inhibit pulses at a frequency much lower than ultrasonic frequency. The inhibit pulse train is passed through the OR gate 28 to the AND gate 27 to interrupt the inverter 16 output and to give a warning indication that the utensil is vertically excessively displaced from the surface of the cook top 30 even if the utensil is centered with the heating coil 20, or a small utensil inadequate for induction heating such as fork, spoon or excessively small vessel is inadvertently or intentionally located on the cook top. If such inadequate utensil is placed at the center of the heating coil 20, the permanent magnet 37 is activated and the contacts of reed switch 39 open thus giving no indication of this unfavorable condition. As a result of the interrupted inverter action, the inadquate utensil is not excessively heated, as a precaution against skin burn which would otherwise occur when the user attempts to pick the utensil off the cook top by hand. As mentioned previously, the power level of the inverter 16 output is substantially reduced by the inhibit pulses supplied from the pulse generator 56 and radio interference is minimized.

FIGS. 6 and 7 are illustrations of alternative arrangements of detector coils 32-35. In FIG. 6 the detector coils 32-35 are mounted with the axes there oriented in a direction parallel with the plane of the spiral coil 20, instead of the axes being oriented vertically as in the embodiment of FIG. 2. The arrangement of FIG. 7 differs from FIG. 6 in that each detector coil includes a ferrite core a mounted below the heating coil 20 extending radially inwardly toward the center of the coil 20. The effect of the ferrite core a is to increase the amount of current detected by the associated detector coil.

Figure 8:
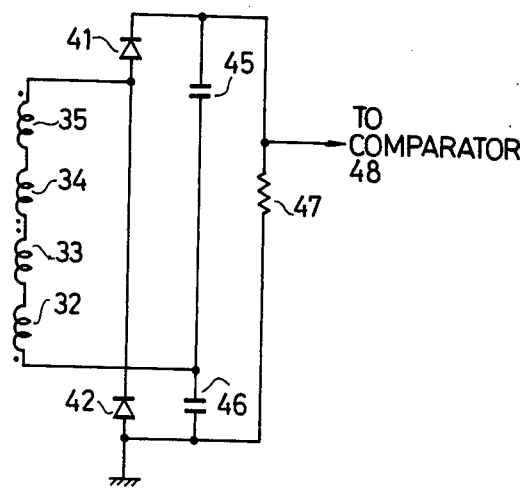
FIG. 8 is an illustration of an alternative connection of the magnetic field sensors in the peak detector.

FIG. 8 is an alternative connection of the detector coils 32-35 in which all the coils are connected in a series circuit between the junction of diodes 41 and 42 and the junction of capacitors 45 and 46 with the directions of winding of the diametrically oppositely arranged coils being connected in opposite sense as in FIG. 4.

When the cooking apparatus is switched off, a power switch 13b which is operated simultaneously with the switch 13a is closed to reset the flip-flop 26.

The above and still further objects, features and advantages of the present invention will become apparent upon consideration of the following detailed description of several specific embodiments thereof, especially when taken in conjunction with the accompanying drawings.

What is claimed is:

1. An induction heating cooking apparatus having an ultrasonic frequency energy source powered by a low frequency energy source, and a spirally wound induction heating coil of a flat configuration energized by said ultrasonic frequency energy source to provide an ultrasonic frequency magnetic field, the coil being mounted below a top plate on which a utensil is placed, comprising:

means positioned and oriented to be responsive to the magnetic field for detecting when said ultrasonic frequency magnetic field has an asymmetric distribution of energy with respect to the center of said heating coil in response to said utensil being located asymmetrically with respect to said center and for deriving a signal indicative of the displacement of said utensil from said center; and means for generating a warning signal in response to said displacement indicative signal having a value associated with at least a predetermined assymmetric displacement.

2. An induction heating cooking apparatus claimed in claim 1, wherein said magentic field distribution detecting means comprises a plurality of ultrasonic frequency magnetic field sensors located symmetrically with respect to the center of said induction heating coil.

3. An induction heating cooking apparatus claimed in claim 2, wherein said magnetic field distribution detecting means comprises a peak detector connected to said magnetic field sensors;

a comparator responsive to an output signal of said peak detector for comparing the output signal with a reference level to generate a comparator output in response to said peak detector output being greater than said reference level;

a monostable multivibrator responsive to said comparator output signal for generating a pulse signal;

means for interrupting said ultrasonic frequency energy supplied to said induction heating coil in response to said pulse signal; and
a warning device responsive to said pulse signal for giving a warning indication.

4. An induction heating cooking apparatus as claimed in claim 2, wherein each of said magnetic field sensors comprises a detector coil.

5. An induction heating cooking apparatus as claimed in claim 4, wherein said detector coils are mounted in pairs, the detector coils of each pair being mounted diametrically opposite to each other with respect to the center of said induction heating coil.

6. An induction heating cooking apparatus as claimed in claim 5, wherein each of said detector coils includes a core element extending radially toward the center of said induction heating coil.

7. An induction heating cooking apparatus as claimed in claim 5 or 6, wherein the detector coils of each pair have their windings connected in series in opposite sense.

8. An induction heating cooking apparatus as claimed in claim 1, further comprising means for reducing the power level of said ultrasonic frequency energy in response to said signal indication.

9. An induction heating cooking apparatus as claimed in claim 1, or 8, further comprising means for generating a signal indicative of the amount of power input to said apparatus, means for comparing said power input indicative signal with a reference level to generate an output signal when said power input indicative signal is smaller than said reference level, and a low frequency pulse generator responsive to said output signal from said comparing means for generating pulses at a frequency much lower than ultrasonic frequency for interrupting said ultrasonic frequency energy.

10. An induction heating cooking apparatus as claimed in claim 1 or 8, further comprising a magnetic proximity sensor located at the center of said induction heating coil for generating a signal in the absence of a magnetic utensil load above the center of said induction heating coil, means for inhibiting said ultrasonic frequency energy in response to said output signal of said magnetic proximity sensor, and a warning device for giving a warning indication in response to said output signal of said magnetic proximity sensor.

11. An induction heating cooking apparatus as claimed in claim 10 further comprising means for generating a signal indicative of the amount of power input to said apparatus, means for comparing said power input indicative signal with a reference level to generate an output signal when said power input indicative signal is smaller than said reference level, and a low frequency pulse generator responsive to said output signal from said comparing means for generating pulses at a frequency much lower than ultrasonic frequency for interrupting said ultrasonic frequency energy.

12. The apparatus of claim 1 wherein the detecting means comprises plural detector coils.

13. An induction heating cooking apparatus as claimed in claim 12 wherein said detector coils are mounted in pairs, the detector coils of each pair being mounted diametrically opposite to each other with respect to the center of said induction heating coil.

14. An induction heating cooking apparatus as claimed in claim 13 wherein each of said detector coils includes a core element extending radially toward the center of said induction heating coil.

15. An induction heating cooking apparatus as claimed in claim 14 wherein the detector coils of each pair have windings connected in series in opposite sense.

16. An induction heating cooking apparatus as claimed in claim 1 wherein said magnetic field distribution detecting means comprises a peak detector for deriving an output indicative of the peak value of the displacement signal;
a comparator responsive to an output signal of said peak detector for comparing the output signal with a reference level to generate a comparator output in response to said peak detector output being greater than said reference level;
a monostable multivibrator responsive to said comparator output signal for generating a pulse signal;
means for interrupting said ultrasonic frequency energy supplied to said induction heating coil in response to said pulse signal; and
a warning device responsive to said pulse signal for giving a warning indication.

17. An induction heating cooking apparatus as claimed in claim 16 wherein said ultrasonic frequency energy source comprises a gate controlled switching device connected to receive power from said low frequency energy source, a commutating circuit including said induction heating coil connected to said switching device, a gating pulse generator for generating gating pulses of ultrasonic frequency for said switching device, a zero crossing detector for generating an output signal in response to said low frequency energy reaching a substantially zero level, and means for applying said gating pulses to the control gate of said switching device in response to an output signal from said zero crossing detector to generate said ultrasonic frequency energy after the termination of said pulse signal.

18. An induction heating cooking apparatus having an ultrasonic frequency energy source powered by a low frequency energy source, and a spirally wound induction heating coil of a flat configuration mounted below a top plate on which a utensil is placed and energized by said ultrasonic frequency energy for generating a time-varying magnetic field, comprising:
means for generating signal indicative of an unbalance between the intensities of magnetic field at mutually spaced-apart locations adjacent to the perimeter of said induction heating coil when said utensil is located asymmetrically with respect to the center of said induction heating coil, said means comprising plural magnetic field sensors respectively mounted in said locations; and
means for giving a warning indication when said unbalance indicative signal exceeds a predetermined value, said means for generating said unbalance indicative signal comprising a peak detector connected to said magnetic field sensors, said means for giving a warning indication comprising:
a comparator in receipt of an output signal of said peak detector for making a comparison with a reference level to generate a comparator output when said peak detector output is greater than said reference level;
a monostable multivibrator responsive to said comparator output signal for generating a pulse signal;
means for interrupting said ultrasonic frequency energy supplied to said induction heating coil in response to said pulse signal; and a warning device responsive to said pulse signal for giving a warning indication.

19. An induction heating cooking apparatus as claimed in claim 3, or 18 wherein said ultrasonic frequency energy source comprises a gate controlled switching device connected to receive power from said low frequency energy source, a commutating circuit including said induction heating coil connected to said switching device, a gating pulse generator for generating gating pulses of ultrasonic frequency for said switching device, a zero crossing detector for generating an output signal in response to said low frequency energy reaching a substantially zero level, and means for applying said gating pulses to the control gate of said switching device in response to an output signal from said zero crossing detector to generate said ultrasonic frequency energy after the termination of said pulse signal.

20. A circuit for use in an induction heating cooking apparatus having an ultrasonic frequency energy source powered by a low frequency energy source, and a spirally wound induction heating coil of a flat configuration mounted below a top plate and energized by said ultrasonic frequency energy to generate a time-varying magnetic field, comprising:
means for generating a signal indicative of an unbalance between the intensities of magnetic field at mutually spaced-apart locations adjacent to the perimeter of said induction heating coil when a utensil is located on said top plate asymmetrically with respect to the center of said induction heating coil; said signal generating means comprising a plurality of magnetic field sensors mounted respectively in said locations; and
means for giving a warning indication when said unbalanced indicative signal exceeds a predetermined value, said means for generating said unbalance indicative signal comprising a peak detector connected to said magnetic field sensors, said means for giving a warning indication comprising:
a comparator in receipt of an output signal of said peak detector for making a comparison with a reference level to generate a comparator output when said peak detector output is greater than said reference level;
a monostable multivibrator responsive to said comparator output signal and for generating a pulse signal;
means for interrupting said ultrasonic frequency energy in response to said pulse signal; and
wherein said warning signal generating means is responsive to said pulse signal.

21. A circuit for use in an induction heating cooking apparatus having an ultrasonic frequency energy source powered by a low frequency energy source, and a spirally wound induction heating coil of a flat configuration energized by said ultrasonic frequency energy source to provide an ultrasonic frequency magnetic field, the coil being mounted below a top plate on which a utensil is placed, comprising:
means positioned and oriented to be responsive to the magnetic field for detecting when said ultrasonic frequency magnetic field has an asymmetric distribution of energy with respect to the center of said heating coil in response to said utensil being located asymmetrically with respect to said center and for deriving a signal indicative of the displacement of said utensil from said center; and
means for generating a warning signal in response to said displacement indicative signal exceeding a predetermined value.

22. A circuit as claimed in claim 21 further comprising a magnetic proximity sensor located at the center of said induction heating coil for generating a signal in the absence of a magnetic utensil load above the center of said induction heating coil, means for inhibiting said ultrasonic energy in response to said output signal of said magnetic proximity sensor, and a warning device for giving a warning indication in response to said output signal of said magnetic proximity sensor.

23. A circuit as claimed in claim 21, further comprising means for generating a signal indicative of the amount of power input to said apparatus, means for comparing said power input indicative signal with a reference level to generate an output signal when said power input indicative signal is smaller than said reference level, and a low frequency pulse generator responsive to said output signal from said comparing means for generating pulses at a frequency much lower than ultrasonic frequency for interrupting said ultrasonic frequency energy.

24. The apparatus of claim 21 wherein the detecting means comprises plural detector coils.

25. An induction heating cooking apparatus as claimed in claim 24 wherein said detector coils are mounted in pairs, the detector coils of each pair being mounted diametrically opposite to each other with respect to the center of said induction heating coil.

26. An induction heating cooking apparatus as claimed in claim 25 wherein each of said detector coils includes a core element extending radially toward the center of said induction heating coil.

27. An induction heating cooking apparatus as claimed in claim 26 wherein the detector coils of each pair have windings connected in series in opposite sense.

28. A circuit as claimed in claim 21 wherein said ultrasonic frequency magnetic field distribution detecting means comprises a plurality of ultrasonic frequency magnetic field sensors located symmetrically with respect to the center of said induction heating coil.

29. A circuit as claimed in claim 28, wherein each of said magnetic field sensors comprises a detector coil.

30. A circuit as claimed in claim 29, wherein said detector coils are mounted in pairs, the detector coils of each pair being mounted diametrically opposite to each other with respect to the center of said induction heating coil.

31. A circuit as claimed in claim 30, wherein each of said detector coils includes a core element extending radially toward the center of said induction heating coil.

32. A circuit as claimed in claim 30 or 31, wherein the detector coils of each pair have their windings connected in series in opposite sense.

33. A circuit as claimed in claim 29, further comprising means for reducing the power level of said ultrasonic frequency energy in response to said warning signal.

34. A circuit as claimed in claim 33 further comprising a magnetic proximity sensor located at the center of said induction heating coil for generating a signal in the absence of a magnetic utensil load above the center of said induction heating coil, means for inhibiting said ultrasonic energy in response to said output signal of said magnetic proximity sensor, and a warning device for giving a warning indication in response to said output saignl of said magnetic proximity sensor.

35. A circuit as claimed in claim 33 further comprising means for generating a signal indicative of the amount of power input to said apparatus, means for comparing said power input indicative signal with a reference level to generate an output signal when said power input indicative signal is smaller than said reference level, and a low frequency pulse generator responsive to said output signal from said comparing means for generating pulses at a frequency much lower than ultrasonic frequency for interrupting said ultrasonic frequency energy.

36. A circuit as claimed in claim 21 or 28, wherein said magnetic field distribution detecting means comprises a peak detector connected to said magnetic field sensors;
    a comparator responsive to an output signal of said peak detector for comparing the output signal with a reference level to generate a comparator output when said peak detector output is greater than said reference level;
    a monostable multivibrator responsive to said comparator output signal and for generating a pulse signal;
    means for interrupting said ultrasonic frequency energy in response to said pulse signal; and
    wherein said warning signal generating means is responsive to said pulse signal.

37. Apparatus for detecting asymmetrical placement of a magnetic utensil on an induction heating cooking apparatus responsive to an ultrasonic frequency energy source, said source supplying power to a spirally wound induction heating coil having a flat configuration so that an ultrasonic frequency magnetic field is proximate the coil, comprising:
    magnetic field detecting means positioned and oriented to be responsive to the ultrasonic frequency magnetic field proximate the coil, the detecting means being positioned and oriented so that magnetic fluxes having first and second amplitude range relationships at the ultrasonic frequency are respectively induced therein in response to the utensil being symmetrically and assymmetrically positioned on the coil; and
    means responsive to the second amplitude range relationship of the induced magnetic fluxes for deriving a warning signal indicative of the asymmetrical placement.

38. The apparatus of claim 37 wherein the warning signal deriving means includes means for reducing power coupled from the ultrasonic source to the coil in response to the amplitude being in the second range.

39. Apparatus for detecting asymetrical placement of a magnetic utensil on an induction heating cooking apparatus responsive to an ultrasonic frequency energy source, said source supplying power to a spirally wound induction heating coil having a flat configuration so that an ultrasonic frequency magnetic field is proximate the coil, the magnetic field having symmetric and asymmetric relationships with respect to the center of the coil in response to the utensil being symmetrically and asymmetrically positioned with respect to the center of the coil, comprising:
    magnetic field detecting means positioned and oriented to be responsive to the ultrasonic frequency magnetic field proximate the coil, the detecting means being positioned and oriented so that symmetrical and asymmetrical magnetic fields are respectively induced therein in response to the utensil being symmetrically and asymmetrically positioned on the coil; and
    means responsive to the asymmetrical magnetic field relationship for deriving a warning signal indicative of the asymmetrical placement.

40. The apparatus of claim 39 wherein the warning signal deriving means includes means for reducing power coupled from the ultrasonic source to the coil in response to the asymmetrical magnetic field relationship.

41. The apparatus of claim 37, 38, 39 or 40 further including means responsive to no magnetic object being on the coil for reducing the power coupled from the ultrasonic source to the coil.

42. The apparatus of claim 37, 38, 39 or 40 further including means responsive to the amplitude of power supplied to the source for varying the power supplied by the source to the load.

43. In an induction cooking apparatus, an apparatus for detecting asymmetrical placement of a utensil on a cooking surface of an induction heating cooking apparatus responsive to an ultrasonic frequency energy source, said source supplying power to a spirally wound induction heating coil having a flat configuration so that an ultrasonic frequency magnetic field is proximate the coil, said detecting apparatus comprising,
    a utensil position detecting arrangement including sensor means located below the cooking surface, the sensor means responding to the ultrasonic frequency magnetic field proximate the coil and being positioned so that symmetrical and asymmetrical responses are respectively induced therein in response to the utensil being symmetrically and asymmetrically positioned on the coil; and
    means responsive to the asymmetrical response for deriving a warning signal indicative of the asymmetrical placement.

44. The apparatus of claim 43 wherein the sensor means includes plural individual sensors.

45. The apparatus of claim 44 wherein the individual sensors are located symmetrically with respect to the center of the coil.

46. In an induction cooking apparatus of the type including an induction heating coil and a cooking surface adapted for supporting a cooking utensil in a cooking area above said coil, the improvement comprising:
    a utensil position detecting arrangement for generating a signal indicative of the position of said utensil relative to the approximate center of said area, said arrangement including a set of sensors located below said cooking surface, and set including a plurality of sensors located substantially the same distance from said center, each sensor operative to respond to a magnetic field derived from the induction heating coil to provide a response indicative of the proximity of a portion of said utensil relative thereto, and means responsive to the responses provided by said sensors for generating an output signal indicative of the utensil position.

47. The combination recited in claim 46 wherein said sensors comprise magnetic sensing elements.

48. The combination recited in claim 46 further including circuit means for disabling said induction coil if the utensil is not properly positioned on the cooking surface, said disabling means being responsive to said output signal.

49. The combination recited in claim 48 further including alarm means connected to said circuit means for disabling said induction coil for indicating that said induction coil has been disabled.

* * * * *